United States Patent [19]
Brown et al.

[11] Patent Number: 5,979,111
[45] Date of Patent: Nov. 9, 1999

[54] PLANT GROWING SYSTEM

[75] Inventors: Robert M. Brown, Nipomo; Sandra Fay Fischbein, Arroyo Grande; Graham J. Wright, Santa Maria, all of Calif.

[73] Assignee: Speedling, Inc., Sun City, Fla.

[21] Appl. No.: 09/040,390

[22] Filed: Mar. 18, 1998

[51] Int. Cl.$^6$ .......................... A01G 31/00; A01G 31/02
[52] U.S. Cl. ................................ 47/59; 47/65
[58] Field of Search .......................... 47/59, 62 R, 62 C, 47/62 A, 62 N, 62 E, 39, 65, 18

[56] References Cited

U.S. PATENT DOCUMENTS

| | | | |
|---|---|---|---|
| 2,175,113 | 10/1939 | Fischer | 47/59 |
| 2,531,562 | 11/1950 | Eve | 47/80 |
| 3,451,162 | 6/1969 | Rasmussen | 47/62 E |
| 3,667,159 | 6/1972 | Todd | 47/34.13 |
| 3,925,926 | 12/1975 | Shigeo | 47/1.2 |
| 3,927,491 | 12/1975 | Farnsworth | 47/1.2 |
| 4,004,369 | 1/1977 | Kato et al. | 47/62 |
| 4,028,847 | 6/1977 | Davis et al. | 47/65 |
| 4,034,506 | 7/1977 | Kasahara et al. | 47/64 |
| 4,037,360 | 7/1977 | Farnsworth | 47/63 |
| 4,075,785 | 2/1978 | Jones | 47/64 |
| 4,166,341 | 9/1979 | Vestergaard | 47/59 |
| 4,321,152 | 3/1982 | Sheehan et al. | 252/1 |
| 4,324,069 | 4/1982 | Flagg | 47/62 |
| 4,327,538 | 5/1982 | Milhem et al. | 56/1 |
| 4,468,885 | 9/1984 | Mandish | 47/59 |
| 4,476,651 | 10/1984 | Drury | 47/65 |
| 4,486,977 | 12/1984 | Edgecombe et al. | 47/59 |
| 4,513,533 | 4/1985 | Gething et al. | 47/63 |
| 4,521,989 | 6/1985 | Meyer | 47/14 |
| 4,756,119 | 7/1988 | Chabot | 47/39 |
| 4,793,096 | 12/1988 | Todd, Sr. | 47/59 |
| 4,813,176 | 3/1989 | Takayasu | 47/59 |
| 4,930,253 | 6/1990 | Todd, Sr. | 47/65 |
| 5,252,108 | 10/1993 | Banks | 47/58 |
| 5,355,621 | 10/1994 | Yokota | 47/65 |

FOREIGN PATENT DOCUMENTS

| | | | |
|---|---|---|---|
| 2942743 | 5/1981 | Germany | 47/39 M |
| 3126875 | 1/1983 | Germany | 47/39 M |
| 3737300 | 9/1988 | Germany | 47/39 M |
| 40/6-181643 | 7/1994 | Japan | 47/59 |
| 8502774 | 5/1987 | Netherlands | 47/65 D |
| 8701850 | 3/1989 | Netherlands | 47/39 M |
| 641415 | 2/1984 | Switzerland | 47/39 M |
| 1031309 | 6/1966 | United Kingdom . | |
| 1053508 | 1/1967 | United Kingdom . | |
| 1313121 | 4/1973 | United Kingdom . | |
| 2116014 | 9/1983 | United Kingdom | 47/61 |
| 1038320 | 8/1996 | United Kingdom . | |
| 87/07816 | 12/1987 | WIPO | 47/65 |

OTHER PUBLICATIONS

"Movable Greenhouse Benches Add Space", American Nurseryman, pp. 90–94, Mar. 1985.
"A Step Toward Mechanisation", Grower, pp. 45–49, Jun. 1985.
"Fenhurst's NFT Block Built Specially For The Job", The Grower, pp. 723–727, Oct. 1977.

*Primary Examiner*—Michael J. Carone
*Assistant Examiner*—Fredrick T. French, III
*Attorney, Agent, or Firm*—Thelen, Reid & Priest

[57] ABSTRACT

A plurality of plant flats are supported on a movable plant flat support rack positioned adjacent an irrigation trough for movement between an upper position and a lower position; idler rollers on the support rack engage inclined tracks on opposite sides of the irrigation trough so that horizontal movement of the support rack results in vertical movement of the support between an upper position in which the flats are above the upper surface of the trough liquid and a lower position in which the bottom of the flats is immersed in the liquid in the trough. A portable dive assembly is connected to the plant flat for support effecting horizontal movement of the rolls.

26 Claims, 6 Drawing Sheets

PLANT GROWING SYSTEM

BACKGROUND OF THE INVENTION

1. Field of the Invention

The present invention relates to the growing of seedling plants in plant flats having multiple plant cells each having a drain opening at its lower end. More specifically, the invention relates to a portable power driven apparatus for effecting the simultaneous lifting of multiple plant flats from a lower position engaging trough liquid in an irrigation trough to an elevated position in which bottoms of the flats are spaced above the surface of the trough liquid to effect air pruning of the seedling roots at the drain openings. After a predetermined time period in the elevated position, the apparatus can be activated to the lower position.

2. Related Art

Earlier Todd U.S. Pat. No. 3,667,159 discloses a seedling flat formed of foamed plastic as shown in FIGS. 1 and 2 of said patent in which plant cells 32 are provided with lower openings 34 and are tapered downwardly so that the seedlings can be easily removed from the cell. Seedlings have been grown in such flats with watering being effected by overhead spray means, a procedure that is wasteful of water and can cause disease in the plants. The plant flats of the type disclosed in the Todd patent have been used by positioning their low end in troughs of nutrient containing liquid flows upwardly into the planting cells through the lower openings 34.

It has been previously proposed to provide seedling plants in a plant flat supported on a support from which the plant roots downwardly extend into a floodable trough or the like in which the trough liquid is periodically raised and lowered to provide water and/or nutrients to the roots and to subsequently effect air pruning of the roots. Examples of such devices are found in U.S. Pat. Nos. 3,451,162; 3,925,926; 4,324,069, 4,327,538 and 4,486,977.

It has additionally been proposed for the above noted purpose to provide floating plant flats or the like which float on a body of liquid providing nutrients for plants in the flat as shown in U.S. Pat. Nos. 2,175,113; 2,531,562; 3,927,491; 4,028,847, 4,327,538 and 4,486,977.

It has additionally been proposed for the above noted purpose to provide floating plant flats or the like which float on a body of liquid providing nutrients for plants in the flat as shown in U.S. Pat. Nos. 2,175,113; 2,531,562; 3,927,491; 4,028,847, 4,034,506; 4,037,360; 4,321,152; 4,468,885; and 4,513,533. Additionally, British Patents. Nos. 1,031,309; 1,038,320; 1,053,508; and 1,313,121 also disclosed similar floating plant flat systems.

Another approach has been to provide a trough including fixedly positioned wire means for supporting a plant container such as in U.S. Pat. Nos. 4,075,785 and 4,793,096. Similarly, Austrian Patent No. 241,896 appears to disclose the use of fixed wire supports for plant flats. Other prior art devices of interest include U.S. Pat. Nos. 4,004,369 and 4,166,341.

It is well known in the seedling growing industry to use elongated troughs filled with trough liquid normally comprising nutrient enhanced water. It should be understood that "trough liquid" as used herein is a generic term including plain water or nutrient or chemically enhanced water on which poly-urethane foam plant flats are periodically positioned so that the trough liquid flows upwardly through drain openings in the bottom of plant cell.

While the foregoing operation provides satisfactory results, it also requires the employment of expensive pumps, conduits and storage tanks. Moreover, the conventional systems of the aforementioned type are substantial users of electrical energy.

SUMMARY OF THE INVENTION

Therefore, it is the primary object of the present invention to provide a new and improved plant growing systems which is more economical to fabricate and operate than prior known seedling growing systems.

Yet another object of the present invention is to provide a plant growing system which does not require expensive high capacity pumps, conduits and large storage chambers.

Achievement of the forgoing objects is enabled by the preferred embodiment of the invention which is directed to a plant growing system including an elongated irrigation trough or channel of shallow depth in which a moveable plant flat support rack is positioned for vertical movement between a lower position and a raised position. A plurality of polyurethane foam plant flats are supported on the movable plant flat support rack so that when the rack is in its elevated position, the lower surfaces and the drain openings therein of each plant cell of the flats are spaced above the upper surface of trough liquid provided in the trough so that pruning of any roots extending to the drain opening is effected by contact with the ambient air. However, after passage of a given time period, the rack is moved to lower position in which the lower portion of each plant flat are immersed in the trough liquid which is absorbed upwardly through the drain openings provided in each plant cell at the bottom thereof.

Movement of the plant flat support rack is effected by a portable drive unit connected to one end of the rack for displacing the rack horizontally so that idler rollers protruding from the rack move along a faxedly positions inclined trough rail component on each side of the trough to cause vertical displacement of the rack upwardly or downwardly depending on the direction of movement of the rack. Such vertical displacement results in movement of the rack between from its lower position to its upper position or vice-versa to either lift the flat from contact with the trough liquid or return it into contact with the trough liquid.

BRIEF DESCRIPTION OF THE DRAWINGS

The invention will be better understood by reading the following detailed description of the preferred embodiment with reference to the accompanying drawing figures, in which like reference numerals refer to like elements throughout, and in which.

DETAILED DESCRIPTION OF THE PREFERRED EMBODIMENTS

Figure 1:
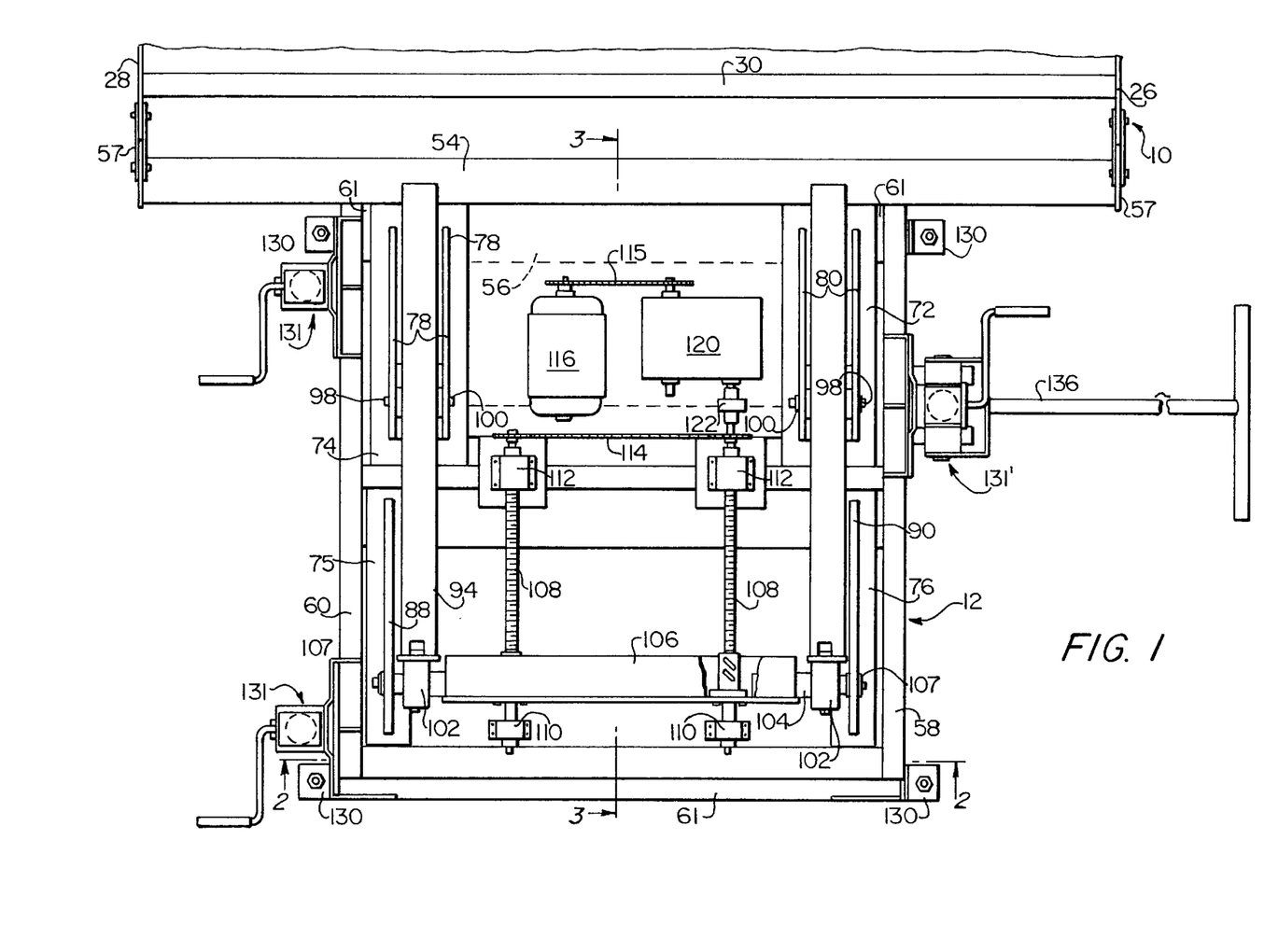
FIG. 1 is a top plan view of the preferred embodiment of the invention.

The preferred embodiment of the present invention comprises two major components; namely, a movable plant flat support rack 10 and a portable drive assembly 12 as shown in FIG. 1. The portable drive assembly can be connected to the movable plant flat support rack 10 for effecting horizontal rack movement which results in movement of the moveable plant flat support rack 10 and plant flats supported thereon between a lower position illustrated in FIGS. 4 and 5 and a raised or elevated position illustrated in FIGS. 6 and 7. Portable drive assembly 12 is supported on the upper surface 11 of a concrete slab 13 as best shown in FIG. 5.

Figure 4:
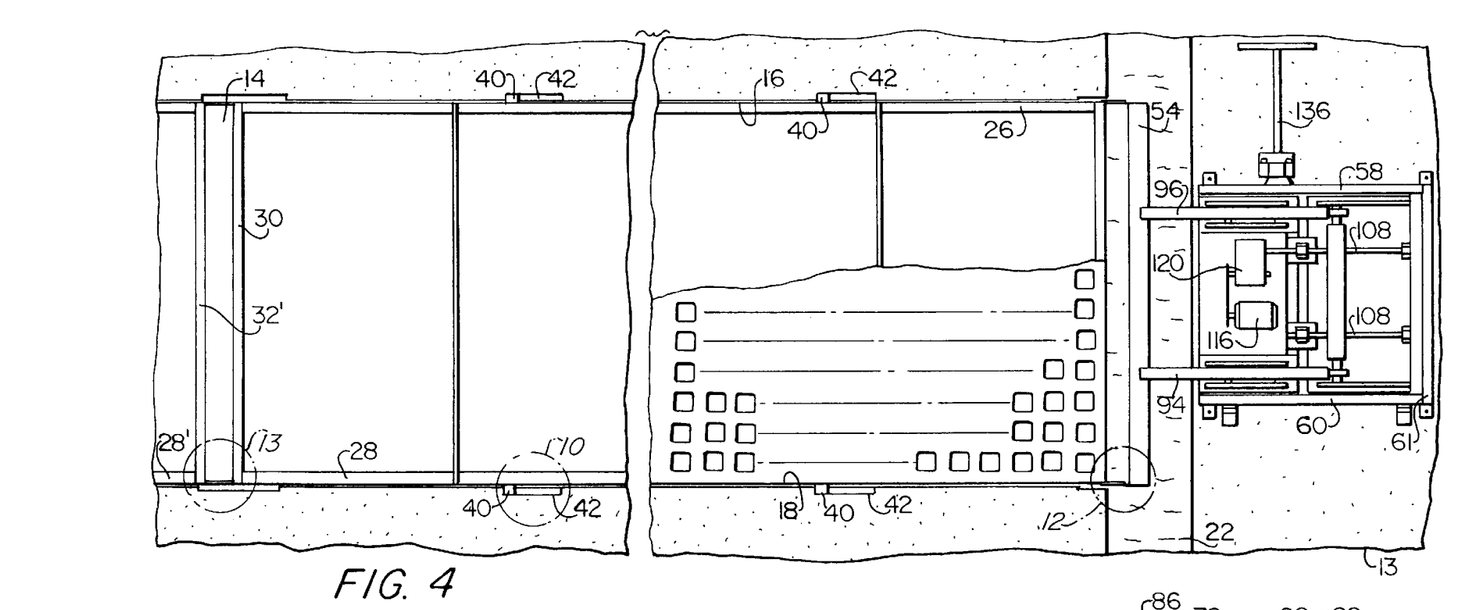
FIG. 4 is a top plan view of the preferred embodiment in an operative position in which the portable drive assembly is connected to a vertically moveable plant flat support rack positioned in an irrigation trough with the movable plant flat support rack being in a lowered position in which the bottom portions of each plant flat are submerged in the trough liquid.
Figure 5:
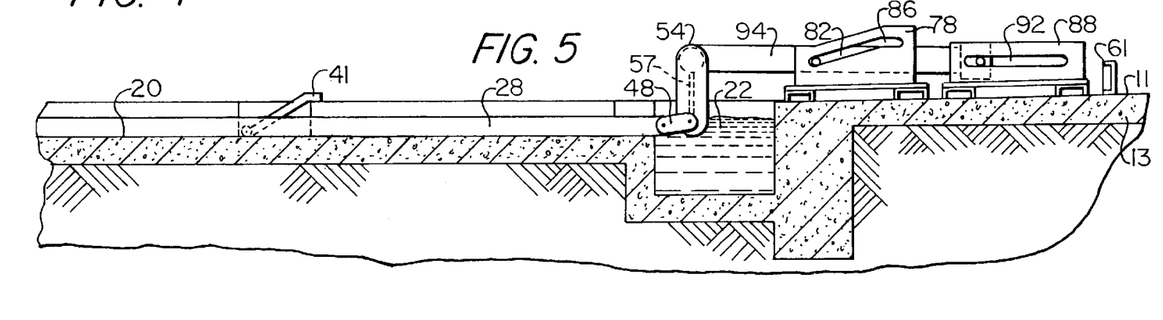
FIG. 5 is a left side elevation view of the apparatus of FIG. 4.
Figure 6:
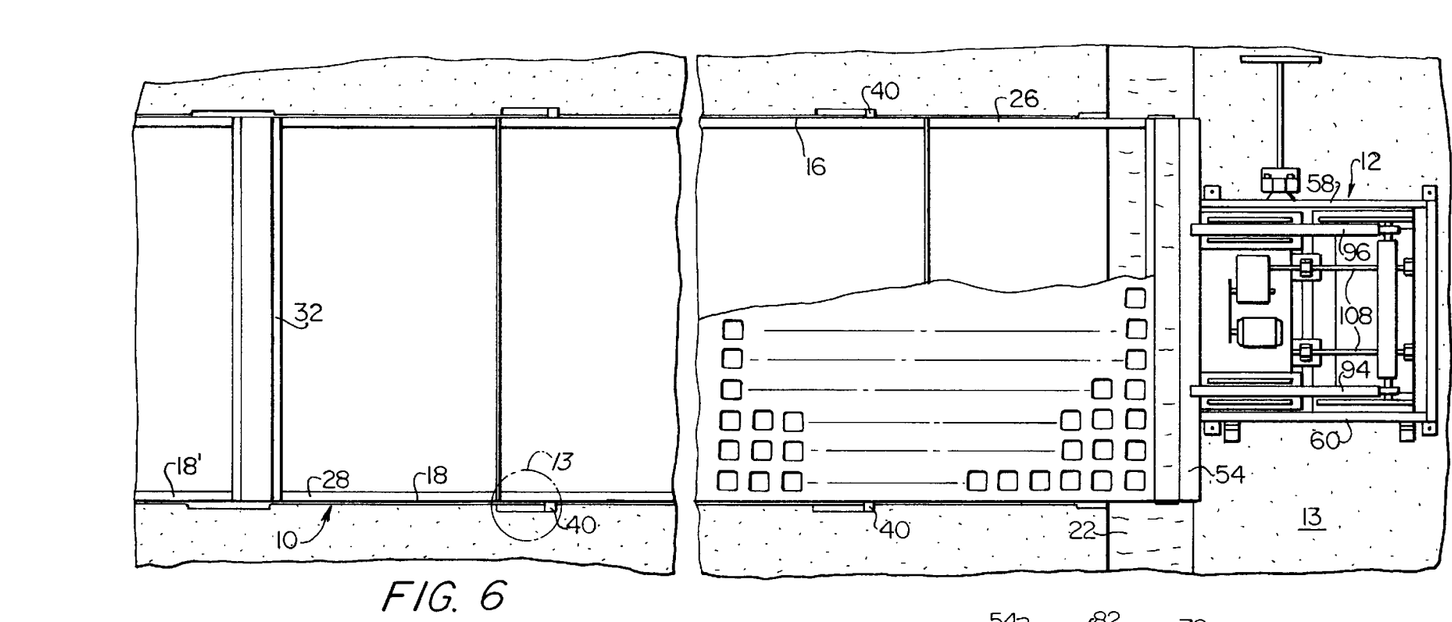
FIG. 6 is a top plan view of the apparatus shown in FIGS. 4 and 5 illustrating the movable plant flat support rack in a raised or elevated position in which the trough liquid does not contact the flats.

The movable plant flat support rack 10 is positioned in an irrigation trough 14 having a right side wall 16 a left side wall 18, as shown in FIGS. 4 and 6. Irrigation trough 14 also has a planar bottom or floor 20. The right end of the irrigation trough 14 as viewed in FIG. 4 terminates at a trough liquid supply channel 22 which supplies a trough liquid water solution which as noted previously may contain fertilizer or other dissolved constituents to the irrigation trough 14 and also serves to drain the trough liquid when required.

The moveable plant flat support rack 10 includes a right side frame 26 and left side frame 28 each of which is connected at one end to forward transverse end frame 30 and at an opposite end to a second or rearward transverse end frame 32 as shown in FIGS. 4 and 6. Plant flats formed of polystyrene foam as shown in U.S. Pat. Nos. 3,667,159 and 4,793,096 are supported by and between side frame members 26 and 28.

Figures 10, 11:
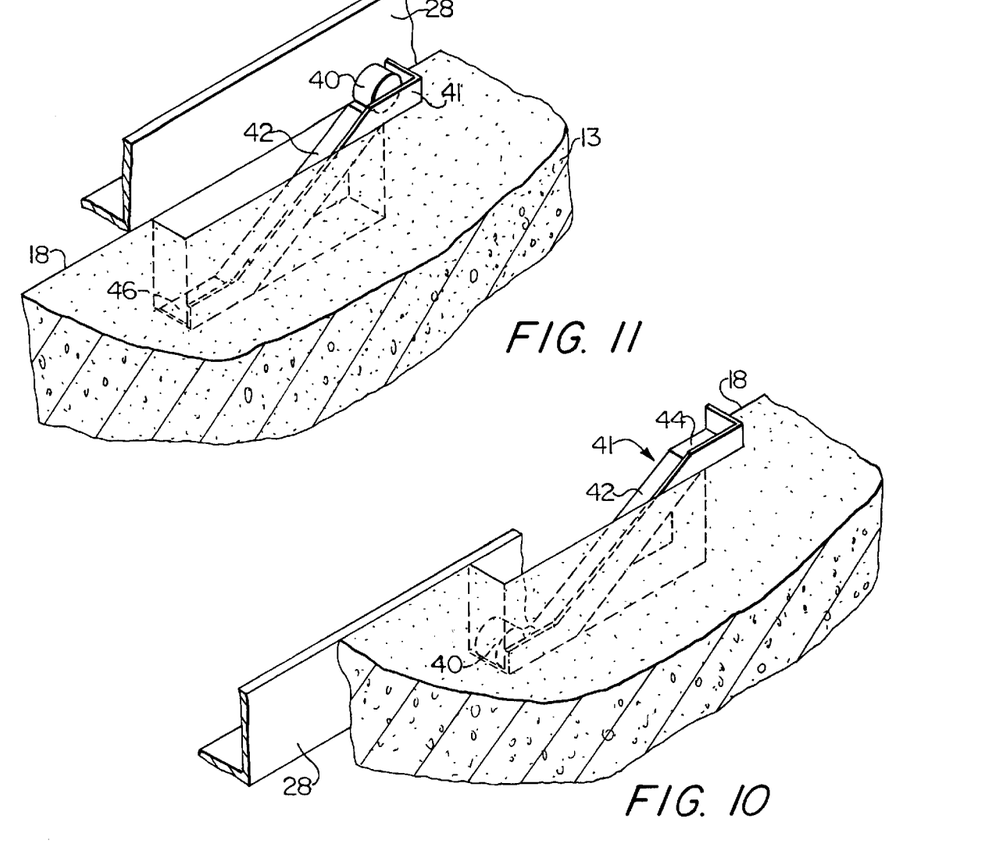
FIG. 10 is a perspective view of the encircled are labeled "FIG. 10" in FIG. 4 illustrating the plant flat support rack side rail and an idler roller thereon in their lower position.
FIG. 11 is similar to FIG. 10 but illustrates the rack side rail and idler roller in their elevated or upper position.

Idler rollers 40 are provided at least two locations on the outer surfaces of the side frame member 26 and the side frame member 28 at spaced intervals. Idler rollers 40 are mounted rotation on axles extending in cantilever manner from the respective side frame member on which they are mounted and are each positioned in and supported by an open-topped trough rail 44 mounted in a recess in one of the facing side walls 16 or 18 of the irrigation trough 14 as best shown in FIGS. 4, 10 and 11. Each open-topped trough rail 41 comprises an inclined linear panel 42, an upper horizontal panel 44 and a lower horizontal panel 46. Horizontal movement of support rack 10 causes idler rollers 40 to move up or down inclined linear panel 42 between horizontal panels 44 and 46 to consequently raise or lower the rack 10 depending on the direction of the horizontal movement. Rollers 40 remain on the horizontal panel 42 or 44 until moved by drive means 12 toward the other panel.

Figure 12:
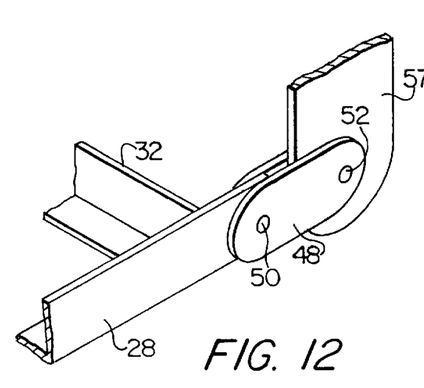
FIG. 12 is a perspective view of the encircled area labeled "FIG. 12" in FIG. 4 illustrating the connection between the portable drive assembly and one end of a plant flat support rack.

Pivotal drive link members 48 (FIG. 12) provide horizontal drive force from portable drive assembly 12 to plant flat support rack 10 and are connected by pivot pins 50 to forward ends of the side frames 26 and 28 of each movable plant flat support rack 10. The opposite ends of drive link members 48 are connected by pivot pins 52 to the lower end of one of two drive arms 57 respectively provided at each end of a push-pull tube 54 (FIG. 1) which is part of the portable drive assembly 12. The drive link means associated with side frame 26 is to illustrated but is a mirror image of the arrangement shown in FIG. 10.

Figure 13:
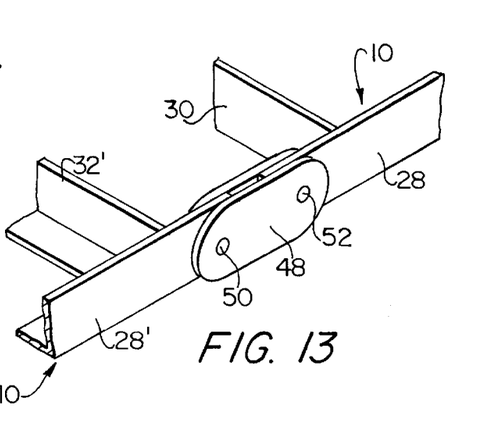
FIG. 13 is a perspective view of the connection between two plant flat support racks.

FIG. 13 illustrates the manner in which the trailing side frame 28' of a trailing support rack 10' having a forward transverse end frame 32' is connected by links 48 and pins 50 and 52 to the side frame 28 of the support rack 10 immediately in front of the trailing support rack. Similarly, the rear ends of side frames 28' can be connected in like manner to the forward ends of a second trailing rack (non shown). Thus, a train consisting of multiple end-to-end connected racks can be provided for simultaneous lifting or lowering movement by actuation of the portable drive assembly 12.

Figure 7:
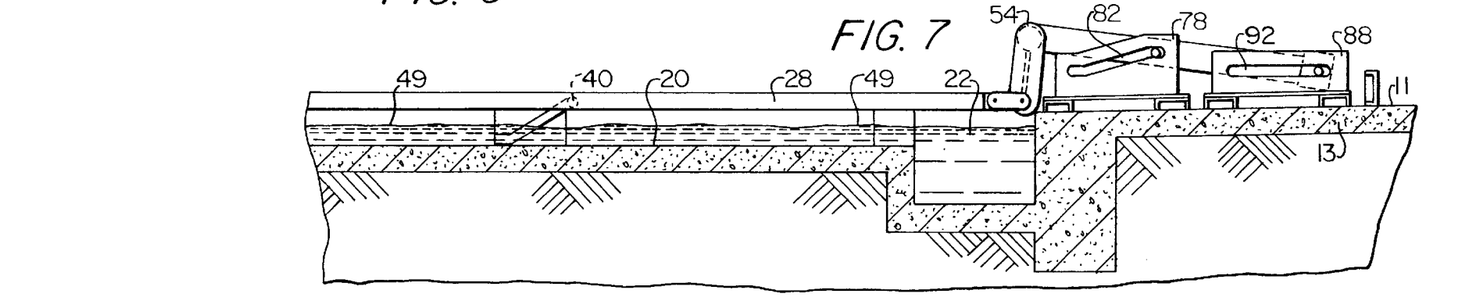
FIG. 7 is a left side elevation view of the apparatus of FIG. 6.

The portable drive assembly 12 is activated to move the push-pull tube 54 to the right from its forward position shown in FIGS. 4 and 5 to its retracted position shown in FIGS. 6 and 7 which movement causes the movable plant flat support rack 10 to move from its lower position to its raised or elevated position. The movable plant flat support rack as shown in FIG. 7 is consequently positioned so that the lower end of the movable plant flat support rack 10 is spaced above the upper surface 49 of the trough liquid. Such movement consequently permits air pruning of any roots at the drain opening at the bottoms of the planting cells of each plant flat.

Figure 3:
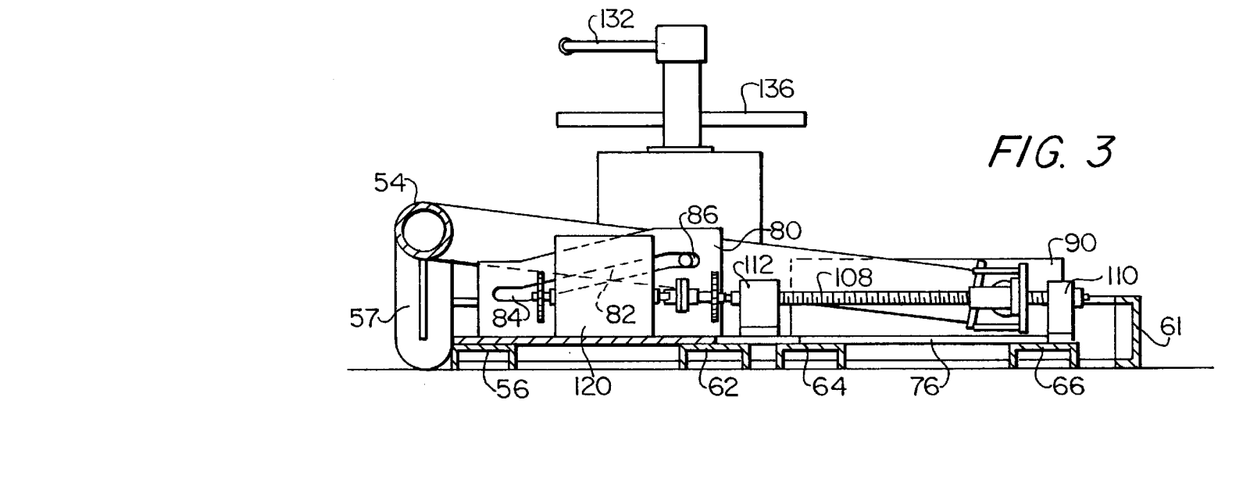
FIG. 3 is a sectional view taken along line 3—3 of FIG. 1.

The portable drive assembly 12 is formed with a main frame of rectangular configuration defined by a rear beam 56, a right side beam 58, a left side beam 60, and a transverse front beam 61 as viewed from above in FIGS. 1 and 3. Three transversely extending interior beams in the form of inverted channels extend between the right side beam 58 and the left sided beam 60 and as shown in FIG. 3. The interior beams comprise a rearmost transverse interior beam 62, a central interior beam 64 and a forward interior beam 66.

A front to rear extending right-hand cam support plate 72 extends horizontally forwardly from the rear beam 56 and, similarly, a left-hand cam support plate 74 (FIG. 1) is provided on the left side of the rear portion of the frame. A left-hand forward cam support plate 75 and right-hand forward cam support plate 76 are similarly provided and extend rearwardly from the forward interior beam 66 as best shown in FIG. 1.

A pair of left-hand lifter cams 78 are mounted on the left-hand cam support plate 75 and a pair of right-hand lifter cams 80 are mounted on the right-hand forward cam support plate 76. Left-hand lifter cams 78 and right-hand lifter cams 80 are identitical and each include a cam slot 82 having a lower slot end 84 and upper slot end 86 as best shown in FIG. 3.

A rearward left-hand guide cam 88 and a rearward right-hand guide cam 90 are respectfully provided on left-hand forward cam support plate 74 and right-hand forward cam support plate 76 as shown in FIG. 1. Guide cams 88 and 90 are of identical construction with each including a linear cam slot 92 (FIG. 7).

A left-hand drive arm 94 has its forward end connected to the push-pull tube 54 and identical right-hand drive arm 96 has its forward end similarly connected to the push-pull tube 54 as best shown in FIG. 1. Forward transverse cam follower shafts 98 are pivotally mounted in the left-hand drive arm 94 and in the right-hand drive arm 96. Cam follower rollers 100 are mounted externally of their respective drive arms on transverse shafts 98 with the rollers 100 being positioned in the cam slots 82 of left-hand lifter cam 78 and right-hand lifter cam 80. Cam follower rollers 100 are mounted on transverse shafts 98 by needle bearing housings to insure smooth and efficient operation.

Similarly, a needle bearing housing 102 is mounted on the forward end of both the left-hand drive arm 94 and the right-hand drive arm 96. Stub shafts 104 as fixedly attached at opposite end of a transversely extending drive beam 106 and support a rotary cam follower roller 107 on their outer end positioned in one or the linear cam slots 92 of the guide cams 88 and 90.

Movement is imparted to drive beam 106 by identical power lead screws 108 (FIG. 1) which are supported at their forward ends by identical rotary bearings 110 and at their rearmost ends by identical rotary bearings 112. Power lead screws 108 are coupled for rotation in unison by a power chain 114 mounted on sprockets on the end of each power lead screw 108. Power for rotating the power lead screws 108 is provided by a motor 116 through a drive chain 115, a gear box 120, and a flexible drive coupler 122 connected to the forward end of the right-hand power lead screw 108 as best shown in FIG. 1.

Prior to the initiation of a lifting operation, the apparatus is in its lower position with the lower portions of each plant flat being immersed in the trough liquid. Movement toward the elevated position of FIG. 7 is initiated by actuation of motor 116 which rotates the power lead screws 108 to cause drive beam 106 and attached shaft 104 and left-hand drive arm 94 and right-hand drive arm 96 to move form the leftmost position of such components as shown in FIG. 5 to the right, to the position shown in FIG. 7. During such movement, cam follower rollers 100 traverse the length of cam slot 82 and move from the lower end of slot 84 to the upper end of slot 86 so as to lift the forward end of left-hand drive arm 94 and right-hand drive arm 96 while concurrently moving push-pull tube 54 to the right. The upward movement and right-hand movement of push-pull tube 54 causes idler rollers 40 on the plant flat support rack 10 to ride upwardly from lower horizontal panel 46 along inclined portion 42 to upper horizontal panel 44 so that the entire length of the movable plant flat support rack 10 is moved upwardly in unison while remaining in horizontal orientation to assume the FIG. 7 position in which the bottom portions of the plant flats are elevated above the upper surface 40 of the trough liquid.

After the movable plant flat support rack 10 has been in the elevated position of FIG. 7 for a desired time period to drain excess liquid and effect air pruning, the power lead screws 108 can be rotated in an opposite direction to return movable plant flat support rack 10 to its FIG. 5 position at such time as desired by the operator. All activation of the drive motor can be enabled by conventional timer means if desired.

It should be noted that anchor tabs 130 (FIG. 1) are provided at each corner of the frame of the portable drive assembly 12. An anchor hook 138 (FIG. 8) is positioned in an opening in each anchor tab 130 and a nut 139 positioned on the threaded upper end of anchor hook 138 can be rotated as desired to raise or lower the anchor hook in an obvious manner. Each anchor hook 138 is engaged with an embedded retainer 128 to hold the drive assembly 12 in fixed position.

Figure 8:
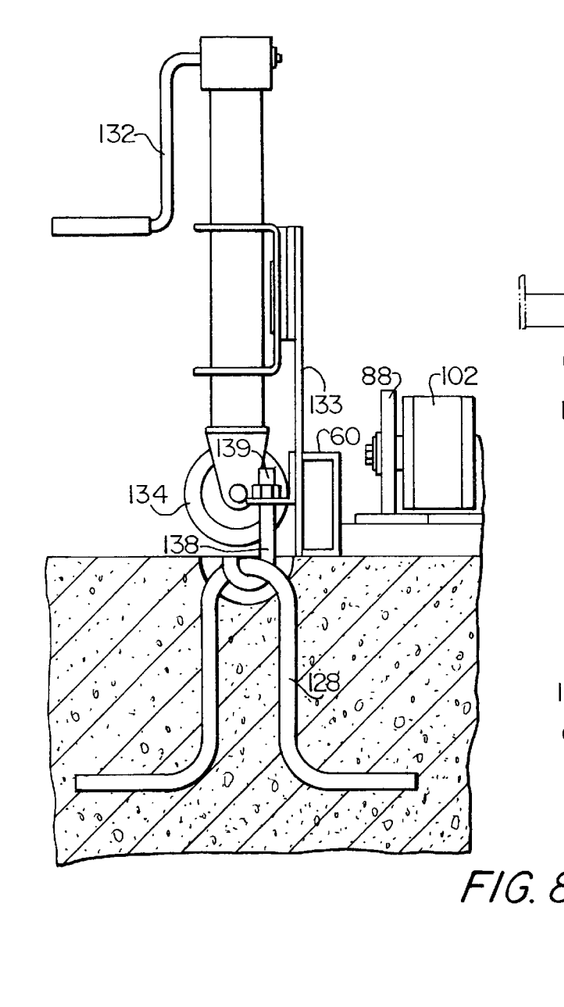
FIG. 8 is an enlarged front elevation of one of four identical screw jack structures employed for lifting for movement or for anchoring the portable drive assembly in a fixed position.
Figure 9:
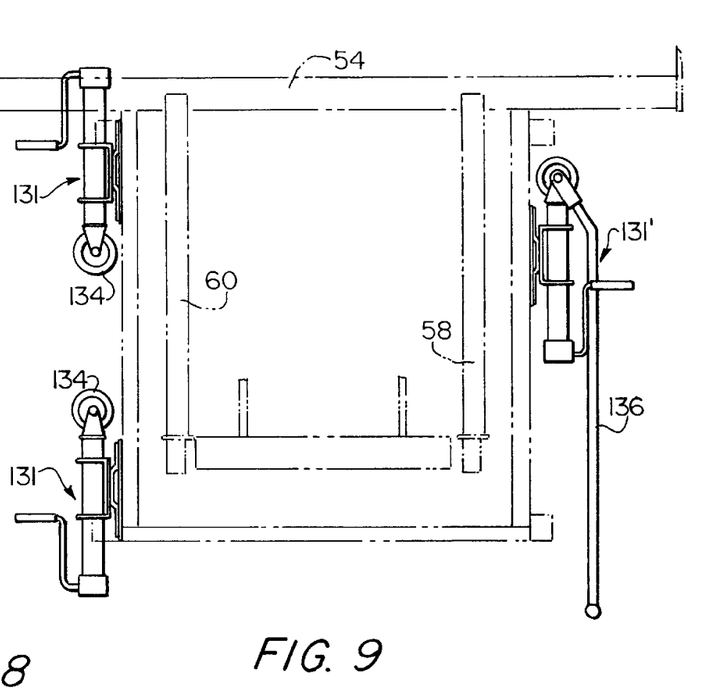
FIG. 9 is a top plan view illustrating the portable drive assembly drive wheels in a folded condition for permitting shipping of the portable drive assembly.

Two conventual caster screw jack assemblies 131 are provided on a support plate 133 on the left side beam 60 (FIG. 8) and have a rotary handle 132 which is operable for raising and lowering caster wheels 134. An identical caster screw jack assembly 131' is provided on the right-side beam 58 as shown in FIG. 9 and a positioner handle 136 is connected to the caster screw jack assembly 131' for enabling steering the caster wheel 134 of screw jack assembly 131'. The positioner handler member 136 is also capable of manipulating and guiding the drive unit 12 from one irrigation trough to another. All of the conventional jack assemblies can be pivoted to a horizontal position for shipping as shown in FIG. 9.

Figure 2:
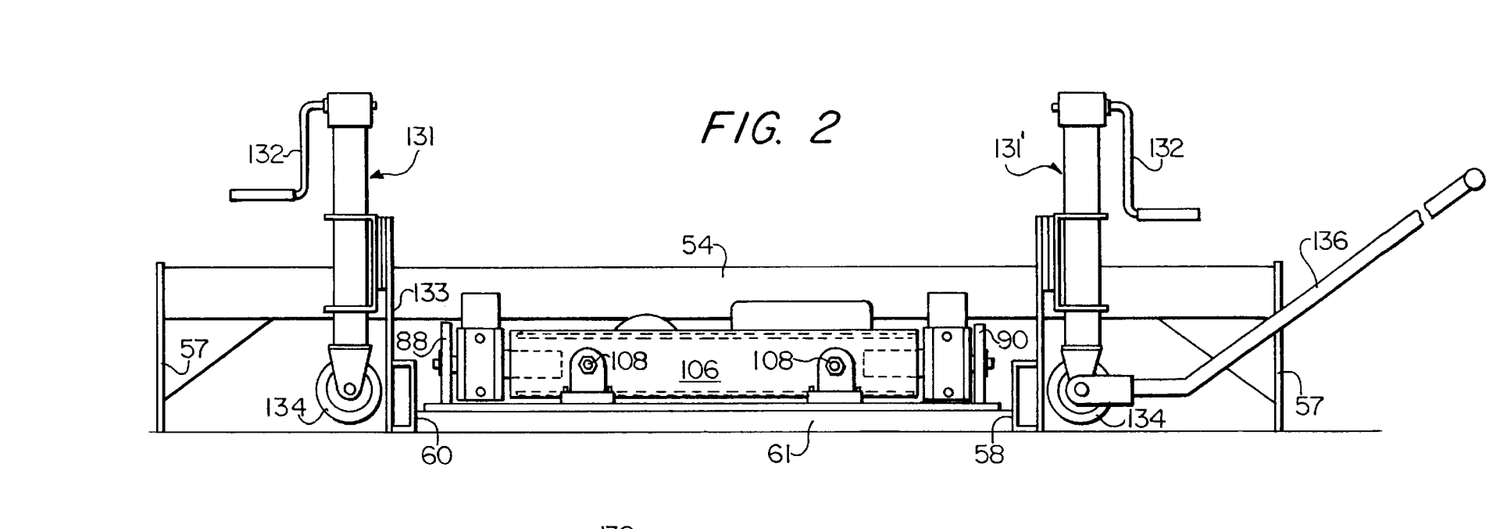
FIG. 2 is a rear elevation of the preferred embodiment.

Movement of the drive unit 12 is effected by first operating handle 136 to extend the caster wheels 134 of each screw jack downwardly to engage surface 11 and lift the drive unit 12 so that wheel support 134 the entire drive unit 12 for movement. When the drive unit is moved to a new position in alignment with the end of a second irrigation trough, the handles 132 are actuated to lift the caster wheels to their upper position and lower the drive means onto surface 11 as shown in FIG. 2. Anchor hook 138 is then passed through the upper U-shaped opening embedded retainer 128 which is embedded in the supporting slab as best shown in FIG. 8. Nuts 139 are threaded on threads on the upper end of each anchor hook 138 and are tightened to snugly retain the drive unit 12 in fixed position adjacent the second irrigation trough.

The drive unit 12 is then connected to moveable plant flat support rack 10 by push-pull tube 54, drive arm 57, drive link members 48 and pins 50 and 52 so that the associated moveable plant flat support rack 10 in the irrigation trough can then be moved between its lower position and elevated position by operation of the drive assembly 12 in the matter previously discussed.

Therefore, it will be seen that the subject invention provides a cost-saving and simplified approach to enabling air pruning of plants in plant flats. Numerous modifications of the invention will undoubtably occur skill in the art and it should be understood that the spirit and scopy of the invention is to be limited solely by the appended claims.

What is claimed is:

1. A plant growing system including:
   an elongated open topped irrigation trough having side walls and first and second ends and trough liquid having an upper surface within the confines of the irrigation trough:
   a movable plant flat support rack positioned adjacent said irrigation trough for bodily vertical movement between an upper position and a lower position;
   a plurality of plant flats each having plant receiving cells with a lower drain/inflow opening in each cell in the lower extent of said plant receiving cell, said plant flats being positioned on said movable plant flat support rack in horizontal alignment with each other so that said plant flat support rack supports the plant flats equidistantly above the upper surface of the trough liquid and simultaneously positions said plant flats so that said drain/inflow openings are simultaneously submerged in the trough liquid when said plant flat support rack is bodily moved into its lower position; and rack positioning means for moving said plant flat support rack to its upper position in response to the application of force to said plant flat support rack in a first horizontal direction and for moving said plant flat support rack from its upper position to its lower position in response to the application of force to said plant flat support rack in a second horizontal direction.

2. A plant system as recited in claim 1, additionally including a power drive assembly connected to said plant flat support rack for selectively applying force to said plant flat support rack in either said first direction or said second direction.

3. A plant growing system recited in claim 1 additionally including a portable power drive assembly selectively connected to said plant flat support rack for selectively applying force to said plant flat support rack in either said first horizontal direction or said second horizontal direction and including wheel means operable for supporting said portable power drive assembly for permitting positioning movement thereof.

4. A plant growing system recited in claim 1 additionally including idler roller means mounted on said plant flat support rack and wherein said rack positioning means includes trough rail means including an inclined portion fixedly positioned on the trough side walls and engaging and supporting each of said idler roller means for movement along the trough rail means to effect vertical displacement of said plant flat support rack.

5. A plant growing system as recited in claim 4 wherein said trough rail means additionally includes horizontal portions at opposite ends of said inclined portion of said trough rail means.

6. A plant growing system as recited in claim 1 wherein said plant flat support rack is of rectangular configuration and includes lengthwise extending side frame members and transverse end frame members at each end of said plant flat support rack.

7. A plant growing system as recited in claim 6 wherein said plant flat support rack includes a plurality of parallel transversely extending rods supporting said plant flats extending between and connected to said lengthwise extending side frame members.

8. A plant growing system as recited in claim 6 wherein said lengthwise extending side frame members are angle members formed of two perpendicular plate components one of which is horizontal and defines the lower extent of said lengthwise extending side frame members and which extends beneath a portion of said plant flats to provide support for said plant flats.

9. A plant growing system as recited in claim 6 additionally including a trough liquid supply channel which is in communication with one end of said trough.

10. A plant growing system as recited in claim 1 additionally including a power drive assembly connected to said plant flat support rack for selectively applying force to said plant flat support rack in either said first horizontal direction or said second horizontal direction so as to effect vertical movement of said plant flat support rack to or from its upper and lower portions and additionally including idler roller means mounted on said plant flat support rack and wherein said rack positioning means includes trough rail means each including and inclined portion provided on the trough side walls and which engages and supports said idler roller means for movement of said idler roller means along said inclined portion to effect vertical displacement of said plant flat support rack.

11. A plant growing system as recited in claim 10 wherein said trough rail means additionally includes horizontal parking rail portions at opposite ends of said inclined portion for receiving and retaining one of said idler rollers so as to maintain said plant flat support rack in one of said upper and lower positions.

12. A plant growing system as recited in claim 11 wherein said plant flat support rack is of rectangular configuration and includes lengthwise extending frame members and transverse end frame members at each end of said plant flat support rack.

13. A plant growing system as recited in claim 1 wherein said rack positioning means includes a power drive assembly connected to said plant flat support rack and which applies force to said plant flat support rack in either a first horizontal direction or a second horizontal direction.

14. A method of sequentially supplying trough liquid to seedlings in a plant flat having a drain opening and air pruning roots at said drain openings in the plant flat, said method comprising:

(a) providing a vertically movable plant flat support movable between upper and lower positions adjacent the upper portion of an irrigation trough containing trough liquid having an upper surface;

(b) positioning at least one plant flat having plural plants cells each having a lower drain opening on said movable plant flat support so that the lower drain openings are immersed in said trough liquid when said plant flat support is in its lower position;

(c) applying generally horizonal force to the movable plant flat support to cause the plant flat support to react with fixedly positioned means to effect vertical movement of the plant flat support in a first direction between its upper and lower positions to position the drain openings either above or in the trough liquid while maintaining said at least one plant flat in horizontal orientation so that all of the drain openings all engage or disengage the trough liquid simultaneously.

15. The method of claim 14 wherein the plant flat support is moved from its lower position to its upper position in response to said horizontal force.

16. The method of claim 14 including the further step of:

(d) applying a reverse horizontal force opposite the horizontal force applied in step (c) to cause said plant flat support to move vertically in an opposite direction to the vertical movement of step (c).

17. The method of claim 16 wherein the vertical movement effected in step (d) is downward movement.

18. A system for growing seedling plants in plant flats having plant cells each having a lower drain/inflow opening, said system including:

an elongated open topped irrigation trough having parallel side walls and first and second ends;

a body of trough liquid having an upper surface within the confines of said open topped irrigation trough:

a movable horizontally oriented plant flat support positioned in said irrigation trough for vertical displacement between an upper position and a lower position;

at least one plant flat having plant receiving cells with a lower drain/inflow opening in each cell in the lower extent of said plant flat and being positioned on said movable plant flat support in horizontal orientation so that said plant flat support supports the plant flat above and parallel to the upper surface of the trough liquid when said plant flat support is in its upper position and positions said plant flat so that said drain/inflow openings are simultaneously submerged in the trough liquid when said plant flat support is moved into its lower position; and power activated positioning means for moving said plant flat support to its upper position by the application of force to said plant flat support in a first direction and for moving said plant flat support from its upper position to its lower position by the application of force to said plant flat support in a second direction.

19. The system for growing seedling plants as recited in claim 18 wherein said power activated positioning means includes a driven movable transverse puller tube having end portions connected to said plant flat support on opposite sides for selectively applying force to said plant flat support in either said first direction or said second direction.

20. The system for growing seedling plants as recited in claim 18 wherein said power activated positioning means includes a portable power drive assembly selectively connectable to said plant flat support rack for selectively applying force to said plant flat support rack in either said first direction or said second direction; selectively operable wheel means operable for supporting said portable power drive assembly for rolling positioning movement; idler rollers mounted on said plant flat support and engageable with trough rail means including an inclined portion fixedly provided on the trough side walls which engages and supports said idler rollers for movement therealong to effect vertical displacement of said plant flat support.

21. A plant growing system including:
    an elongated open topped irrigation trough having side walls and first and second ends and trough liquid having an upper surface within the confines of the irrigation trough:
    a movable plant flat support rack positioned adjacent said irrigation trough for movement between an upper position and a lower position;
    a plurality of plant flats each having plant receiving cells with a lower drain/inflow opening in each cell in the lower extent of said plant receiving cell, said plant flats being positioned on said movable plant flat support rack so that said plant flat support rack supports the plant flats above the upper surface of the trough liquid when said plant flat support rack is in its upper position but supports said plant flats so that said drain/inflow openings are submerged in the trough liquid when said plant flat support rack is in its lower position;
    rack positioning means for moving said plant flat support rack to its upper position in response to the application of force to said plant flat support rack in a first direction and for moving said plant flat support rack from its upper position to its lower position in response to the application of force to said plant flat support rack in a second direction; and
    including idler roller means mounted on said plant flat support rack and wherein said rack positioning means includes trough rail means including an inclined portion fixedly positioned on the trough side walls and engaging and supporting each of said idler roller means for movement along the trough rail means to effect vertical displacement of said plant flat support rack.

22. A plant growing system as recited in claim 21 wherein said trough rail means additionally includes horizontal portions at opposite ends of said inclined portion of said trough rail means.

23. A plant growing system including:
    an elongated open topped irrigation trough having side walls and first and second ends and trough liquid having an upper surface within the confines of the irrigation trough;
    a movable plant flat support rack positioned adjacent said irrigation trough for movement between an upper position and a lower position;
    a plurality of plant flats each having plant receiving cells with a lower drain/inflow opening in each cell in the lower extent of said plant receiving cell, said plant flats being positioned on said movable plant flat support rack so that said plant flat support rack supports the plant flats above the upper surface of the trough liquid when said plant flat support rack is in its upper position but supports said plant flats so that said drain/inflow openings are submerged in the trough liquid when said plant flat support rack is moved into its lower position;
    rack positioning means for moving said plant flat support rack to its upper position in response to the application of force to said plant flat support rack in a first direction and for moving said plant flat support rack from its upper position to its lower position in response to the application of force to said plant flat support rack in a second direction; and
    additionally including a power drive assembly connected to said plant flat support rack for selectively applying force to said plant flat support rack in either said first horizontal direction or said second horizontal direction so as to effect vertical movement of said plant flat support rack to or from its upper and lower portions and additionally including idler roller means mounted on said plant flat support rack and wherein said rack positioning means includes trough rail means each including an inclined portion provided on the trough side walls and which engages and supports said idler roller means for movement of said idler roller means along said inclined portion to effect vertical displacement of said plant flat support rack.

24. A plant growing system as recited in claim 23 wherein said trough rail means additionally includes horizontal parking rail portions at opposite ends of said inclined portion for receiving and retaining one of said idler rollers so as to maintain said plant flat support rack in one of said upper and lower positions.

25. A plant growing system as recited in claim 24 wherein said plant flat support rack is of rectangular configuration and includes lengthwise extending frame members and transverse end frame members at each end of said plant flat support rack.

26. A system for growing seedling plants in plant flats having plant cells with a lower drain/inflow opening, said system including:
    an elongated open topped irrigation trough having parallel side walls and first and second ends;
    a body of trough liquid having an upper surface within the confines of said open topped irrigation trough;
    a movable plant flat support positioned in said irrigation trough for vertical displacement between an upper position and a lower position;
    at least one plant flat having plant receiving cells with a lower drain/inflow opening in each cell in the lower extent of said plant flat and being positioned on said movable plant flat support so that said plant flat support supports the plant flat above the upper surface of the trough liquid when said plant flat support is in its upper position but positions said plant flat so that said drain/ inflow opening are submerged in the trough liquid when said plant flat support is moved into its lower position;

power activated positioning means for moving said plant flat support to its upper position by the application of force to said plant flat support in a first direction and for moving said plant flat support from its upper position to its lower position by the application of force to said plant flat support in a second direction: and wherein said power activated positioning means includes a portable power drive assembly selectively connectable to said plant flat support rack for selectively applying force to said plant flat support rack in either said first direction or said second direction; selectively operable wheel means operable for supporting said portable power drive assembly for rolling positioning movement; idler rollers mounted on said plant flat support and trough rails means including an inclined portion fixedly provided on the trough side walls and engaging and supporting each of said idler rollers for movement therealong to effect vertical displacement of said plant flat support.

* * * * *